United States Patent [19]
Sexton

[11] Patent Number: 5,398,778

[45] Date of Patent: Mar. 21, 1995

[54] LADDER RACK SECURING AND RELEASE SYSTEM

[76] Inventor: Roger Sexton, 1910 NW. 18th St., Pompano Beach, Fla. 33069

[21] Appl. No.: 136,028

[22] Filed: Oct. 14, 1993

[51] Int. Cl.$^6$ ............................................. B60R 9/06
[52] U.S. Cl. .................... 182/127; 248/503; 224/310
[58] Field of Search ............ 182/127; 248/503; 224/310

[56] References Cited

U.S. PATENT DOCUMENTS

| | | | |
|---|---|---|---|
| 4,339,223 | 7/1982 | Golze | 224/310 X |
| 4,826,387 | 5/1989 | Audet | 224/310 X |
| 5,058,791 | 10/1991 | Henriquez et al. | 248/503 X |

FOREIGN PATENT DOCUMENTS

| | | | |
|---|---|---|---|
| 67723 | 12/1982 | European Pat. Off. | 224/310 |
| 2680736 | 3/1993 | France | 224/310 |
| 3215476 | 11/1983 | Germany | 224/310 |
| 8302755 | 8/1983 | WIPO | 224/310 |

*Primary Examiner*—Alvin C. Chin-Shue
*Attorney, Agent, or Firm*—M. K. Silverman

[57] ABSTRACT

A commercial ladder and rack release system for use with utility vehicles such as vans, includes a fixed frame portion which is secured upon the roof of the utility vehicle and a slidable telescopic frame portion to carry a ladder or the like, in which the telescopic frame portion is pivotally connected to the fixed frame portion. Through the use of a double-acting piston, a pair of double-radius defining arms, an eccentric coupling between the fixed and telescoping portions, and a hand lever for providing a mechanical advantage to the user in releasing and deploying the supported load, a ladder rack and release of improved convenience and reliability is provided.

1 Claim, 5 Drawing Sheets

LADDER RACK SECURING AND RELEASE SYSTEM

BACKGROUND OF THE INVENTION

1. Field of Invention

A vehicular ladder rack to movably support a ladder upon a utility vehicle such as a van or the like.

2. Description of the Prior Art

It is a common practice to transport ladders on vehicles such as vans and pick-up trucks. Generally, positioning ladders on top such vehicles is an awkward undertaking. In addition, retaining the ladder in a stationary mode during travel can be difficult. For example, one end of the ladder at a time is ordinarily placed on a rack. Therefore maintaining the first end thereof in place while positioning the other end of the ladder can present difficulties. Once the ladder is atop of the rack, it is ordinarily free to move about, thereby producing objectionable vibrations, noises and abrasive wear upon both the ladder itself and any carrying rack therefore. Moreover, the ladder may become detached from the rack and even fall to the ground. Accordingly, a need has long exist for a simplified ladder rack to facilitate mounting of a ladder atop of vehicles and then the securing of the ladder in place to prevent movement and abrasive wear during transport, all while permitting the ladder to be easily removed as desired.

A further difficulty in the prior art has been that most systems require substantial manual effort in their use such that a typical female worker, such as a telephone installer, will typically encounter difficulty in effecting the convenient and safe removal of the ladder from any of the prior art means for storage and transportation of ladders on utility vehicles that are known in the art. A representative example of the prior art in this area, as best known to the inventor is as follows:

U.S. Pat. No. 3,013,681 discloses a device for storing an elongated article on a vehicle comprising a rack with a plurality of arms pivotally connected along an upper portion of the vehicle. The arms are moveable about a horizontal axis and extend outwardly at substantially right angles to the length of the vehicle during movement between a down position and upright position.

U.S. Pat. No. 3,058,607 teaches a ladder rack for a vehicle comprising ladder-holding members, a pair of links pivotally attached to the vehicle in co-axial relation to each other at opposite ends thereof. A torque element is provided to transmit a turning force.

U.S. Pat. No. 3,963,136 shows a retractable ladder rack for use on the top of vehicle. The rack has one or more channel members which can be attached to the roof of the vehicle, The rack can slide along the channel members to a lower position to facilitate the loading and unloading of a ladder or similar object.

U.S. Pat. No. 4,170,331 discloses a ladder rack mounted on top of a vehicle including upstanding guide stops to hold one end of a ladder while the other end is being pivoted onto the rack.

U.S. Pat. No. 4,262,834 teaches a vehicle rack comprising a clamping device for releasably clamping a ladder thereto. The device includes a clamp arm which is pivoted to a rigid support and operated by a crank mechanism by moving across a dead-center position to secure the ladder in place.

U.S. Pat. No. 4,390,117 discloses a ladder rack for a vehicle roof comprising clamps for releasable attachment to the roof of a vehicle. A subframe carries front and rear ladder support assemblies each comprising transverse rollers for engaging the cross-bars of a ladder.

U.S. Pat. No. 4,826,387 teaches a carrier which can be extended and retracted relative to the rack and hinged to facilitate loading and unloading of the material carried by the rack.

U.S. Pat. No. 5,058,791 teaches a carrier system for a van-type vehicle in which, however, the rack does not lower the ladder to a low enough level to be useful to most female workers.

The instant invention therefore addresses the above shortcomings in the prior art.

SUMMARY OF THE INVENTION

The present invention constitutes a ladder rack and release system for utility vehicles having a flat roof. The system more particularly comprises a pair of linear co-parallel x-axis tracks secured to said roof of said vehicle transversely to a longitudinal y-axis thereof. The system also includes a pair of x-axis linear members, each complementally slidable within a corresponding one of said x-axis tracks. Further provided is a pair of co-parallel first radius-defining xz-plane rotatable arms, an origin of each radius of rotation thereof located at a pivot point located in each of said x-axis moveable members and proximally to a y-axis edge of said roof of said vehicle. Yet further included is a y-axis rod journalled within ends of said x-axis slidable members proximally to said y-axis edge of said vehicle roof.

The system also includes a pair of co-parallel second radius-defining xz-plane rotatable arms, an origin of each radius of rotation thereof defined by a rigid coupling of a pivot end of each of said arms to said y-axis rod, each of said second arms being shorter than each of said arms of said first radius-defining arms. The system further includes ladder-securing means including a pair of linear members each having a distal end pivotally secured to a non-origin end of one each of said first pair of rotatable arms, and each of said linear members pivotally secured at about the centers thereof to a non-origin end of one each of said rotatable arms of said second pair thereof. The inventive ladder storage and release system yet further includes a double-acting piston means having a first end of a first rod thereof pivotally secured at a medial site upon one of said x-axis slidable members and said piston means each having a second end of a second rod thereof eccentrically journalled about said y-axis rod at about a plane that said rod is journalled to one proximal end of one of said x-axis slidable member. The system finally includes a manually actuatable means, such as a lever, for selectably rotating said y-axis rod to thereby urge the rotation in a desired direction of said pair of second radius-defining arms and, therewith, said first radius-defining arms and said ladder-securing means, while such rotation is stabilized by said double acting piston means, It is accordingly an object of the present invention to provide an improved cost-effective system for storage and release of a ladder of a type used in association with a utility vehicle such as a van.

It is another object of the present invention to provide a system for ladder storage and release from the roof of an automotive vehicle which is convenient to employ and which does not require substantial manual effort to utilize.

The above and yet other objects and advantages of the present invention will become apparent from the hereinafter set forth Brief Description of the Drawings, Detailed Description of the Invention and Claims appended herewith,

DETAILED DESCRIPTION OF THE INVENTION

Figure 1:
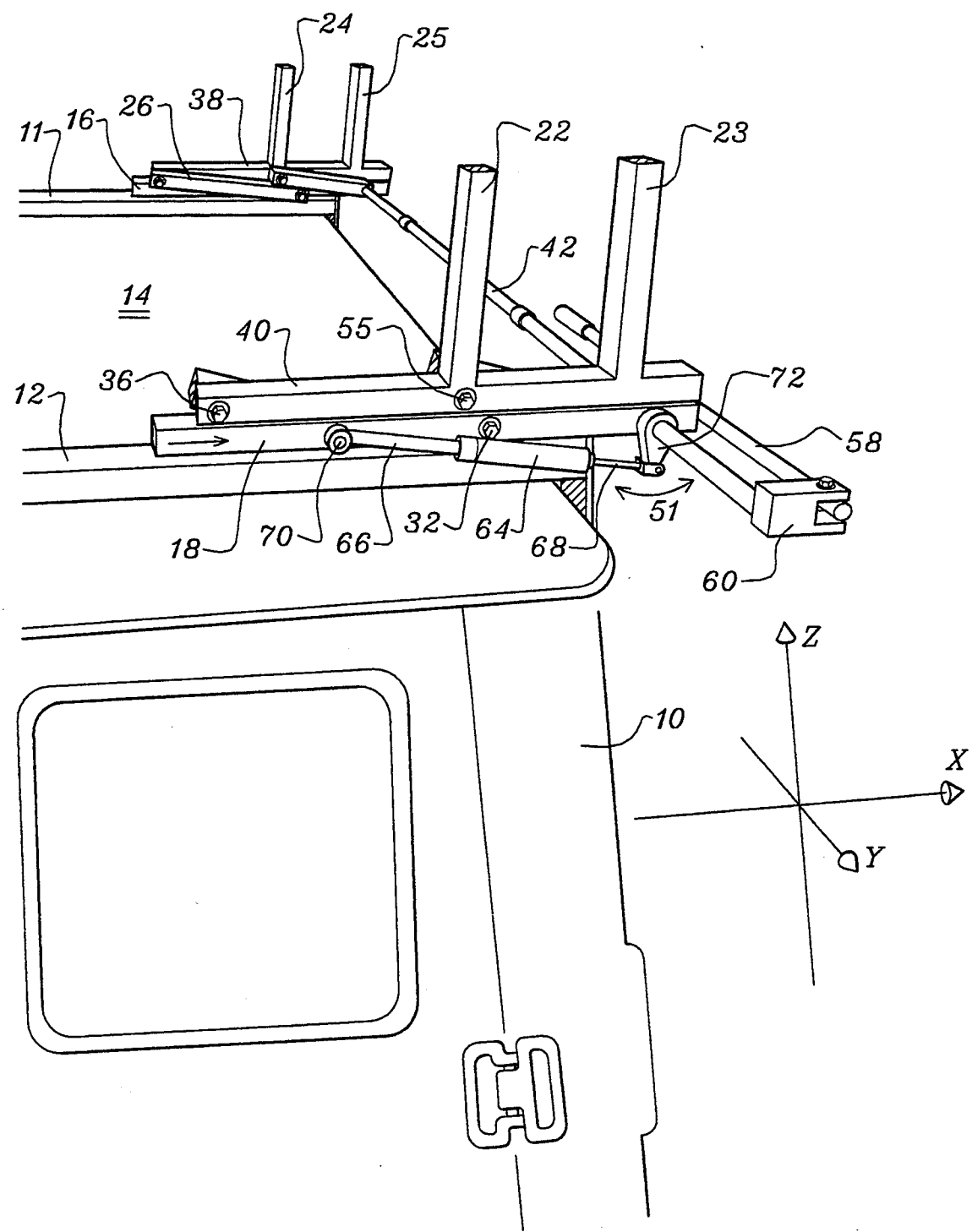
FIG. 1 is a perspective view showing the inventive ladder rack system in its fully secured and stowed position upon a van.

With reference to the view of FIG. 1, there is shown a vehicle 10 upon which is shown the inventive ladder rack securing and release system in its stowed mode as it would exist while a ladder is transported within the structure thereof. It is noted that the view of FIG. 1, as with the other views, includes an xyz Cartesian coordinate axis which is employed to define the directionality of various elements of the instant system, most of which have an orthogonal relationship to each other.

There is, specifically, shown in the view of FIG. 1, a pair of linear co-parallel x-axis tracks 11 and 12 which, at the bases thereof, are rigidly secured to roof 14 of van 10 in an orientation which is transverse to the longitudinal y-axis of the van 10. Further shown in the view of FIG. 1 are a pair of x-axis linear members 16 and 18, each of which are complementally slidable within a corresponding one of said x-axis tracks 11 and 12.

Figure 2:
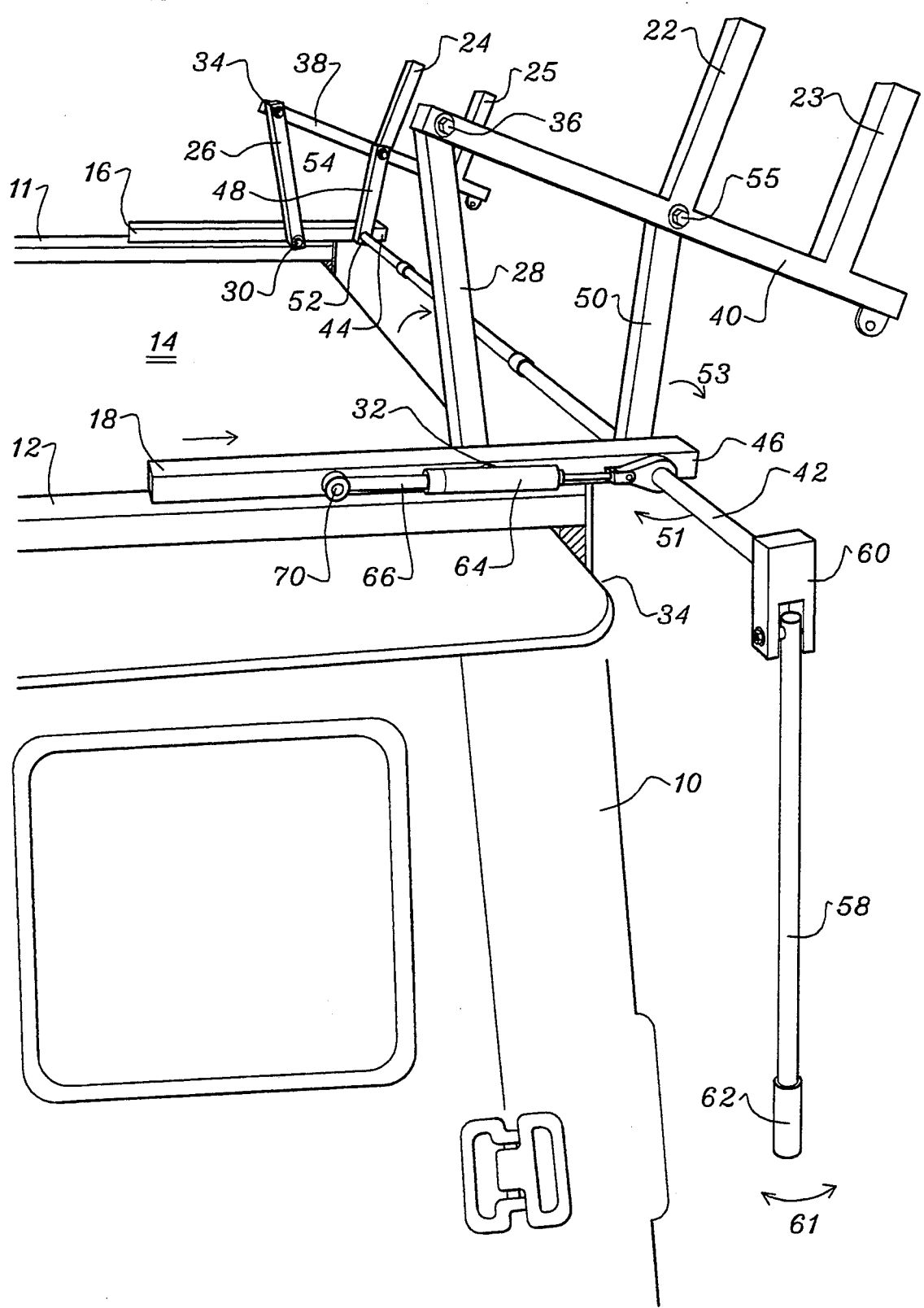
FIG. 2 is a view, similar in type to the view of FIG. 1, however, showing the partial, intermediate stage of deployment of the ladder rack and release system.
Figure 3:
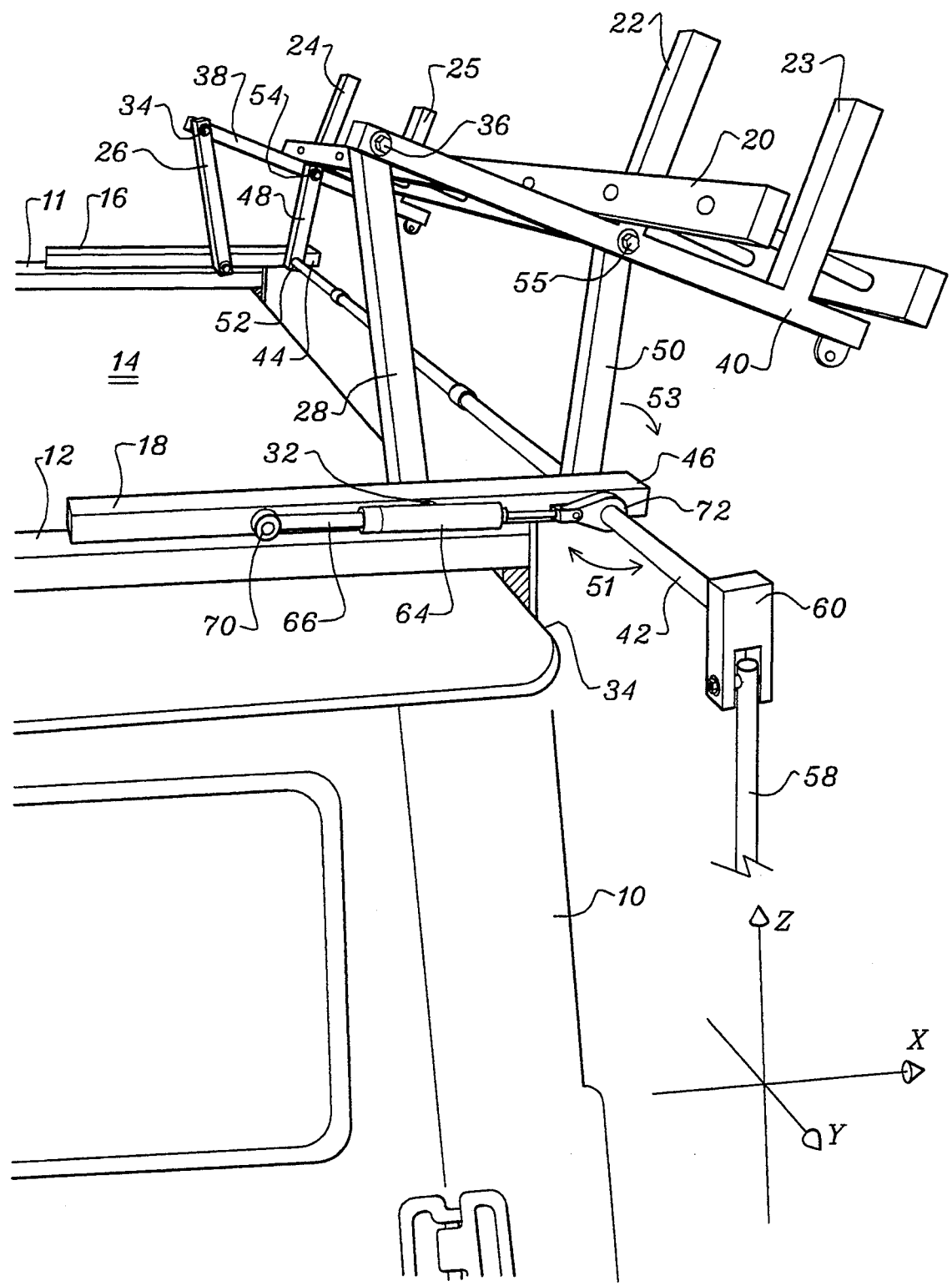
FIG. 3 is a view, identical to the view of FIG. 2, however, showing a typical ladder positioned upon the ladder securing means of the inventive system.

In FIGS. 2 and 3 the apparatus of FIG. 1 is shown in a partially deployed condition in which, in FIG. 3 thereof, a ladder 20 is shown upon ladder-securing elements 22, 23, 24 and 25 (more fully described below). There may, more particularly, be seen in the view of FIGS. 2 and 3 a pair of co-parallel first radius-defining xz-plane rotatable arms 26 and 28. As may be noted in FIGS. 2 and 3 an origin of each radius rotation of said arms 26 and 28 exists at pivot points 30 and 32 within each of said x-axis moveable members 16 and 18. More particularly, said pivot points 30 and 32 are located near to y-axis edge 34 of roof 14 of van 10.

It is noted that each opposite end of first radius-defining arms 26 and 28 define second pivot points 34 and 36 respectively to which co-parallel linear members 38 and 40 are pivotally connected. Said linear members 38 and 40 are a part of the ladder-securing means that includes said elements 22 and 23.

Further provided in the inventive system is a y-axis rod 42 which is journalled within proximal ends 44 and 46 of said x-axis slidable linear members 16 and 18 at locations which are proximal to said y-axis edge 34 of the vehicle roof 14. As may be further seen in the views of FIGS. 2 and 3, there is further provided a pair of co-parallel second radius-defining xz-plane rotatable arms 48 and 50, in which the origin of the radius of rotation of each of said arms is defined by rigid couplings 52 with said y-axis rid 42. Accordingly, upon the rotation (see arrow 51) of said y-axis rod 42, said second radius-defining arms 48 and 50 will be forced to rotate in a clockwise direction as is indicated by arrow 53 next to arm 50 in FIGS. 2 and 3.

It is noted that, in the instant system, the lengths of second radius-defining arms 48 and 50 are each shorter than the lengths of first radius-defining arms 26 and 28.

As may be further noted in the views of FIGS. 2 and 3, upper ends of said arms 48 and 50 are connected, at pivot points 54 and 55 respectively, to said linear members 38 and 40 of the ladder securing means.

Figure 4:
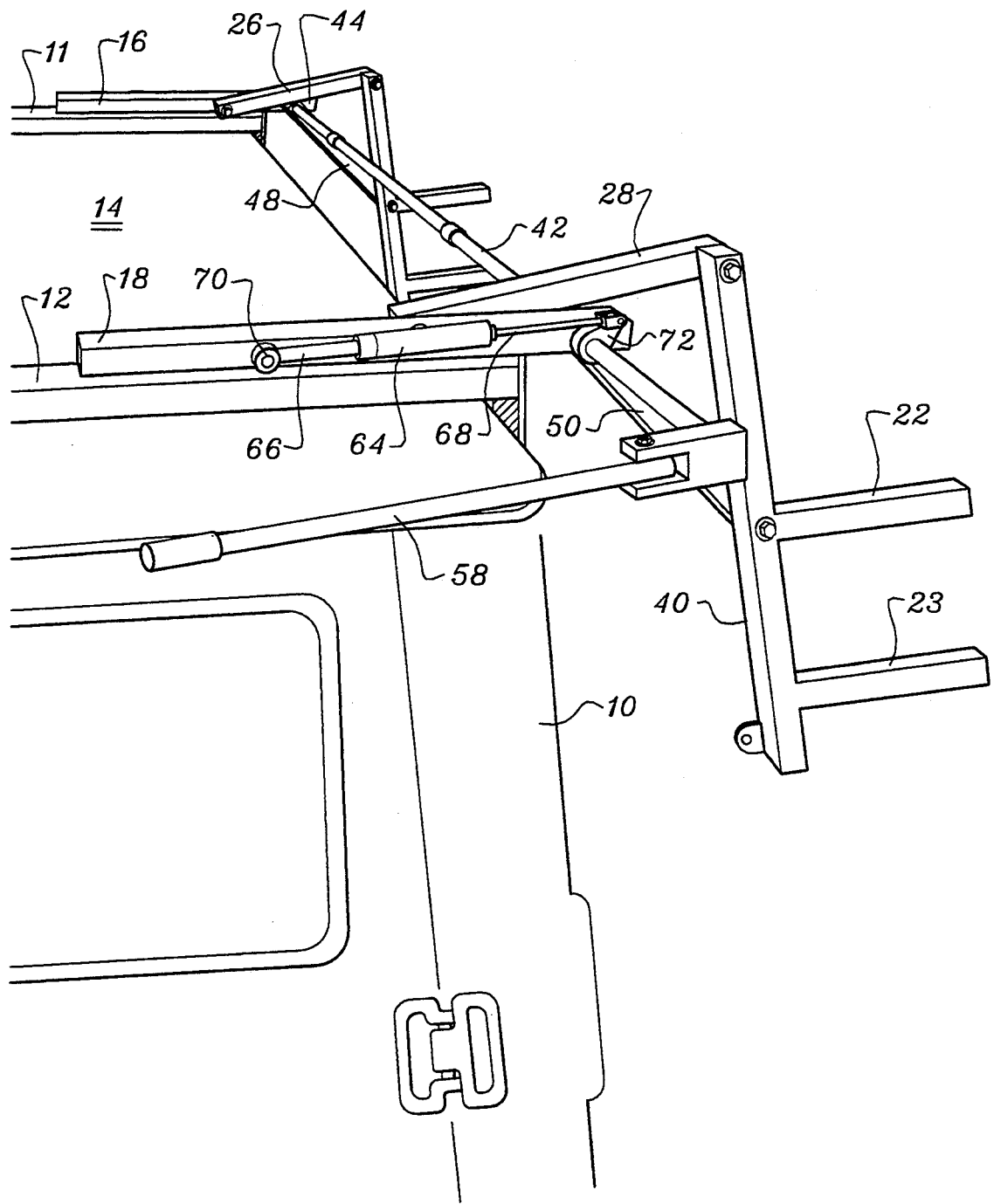
FIG. 4 is a view showing the ladder rack and relay system in its fully deployed mode of operation.
Figure 5:
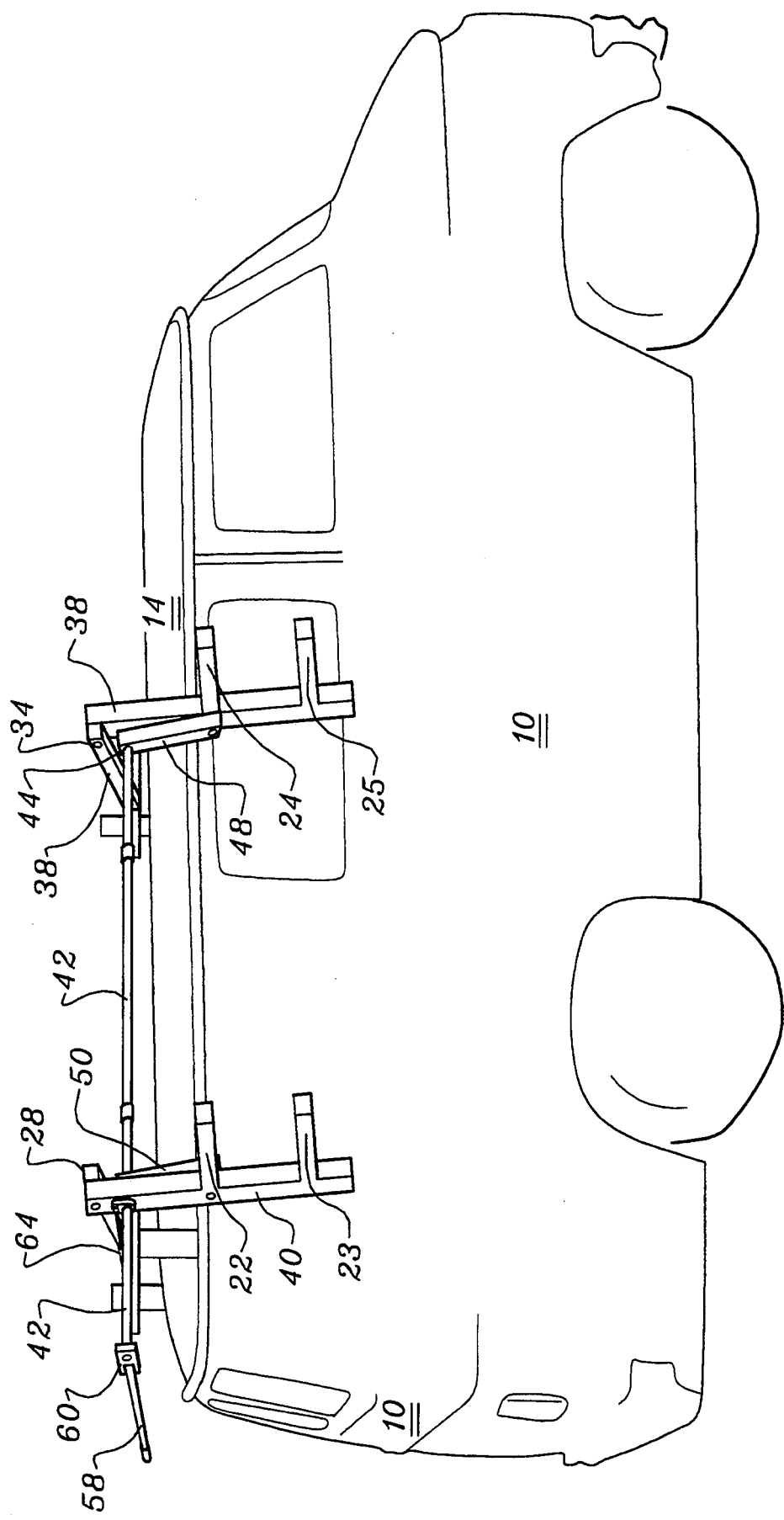
FIG. 5 is a side view of the view of FIG. 4.

Ladder securing means, which include said ladder securement elements 22, 23, 24 and 25, are in combination with said linear members 38 and 40, secured at said pivot points 34, 36, 54 and 55 to respective upper ends of said sets of radius-defining rotatable arms 26, 28, 48 and 50 such that, upon rotation 51 of y-axis rod 42, the entire assembly comprising the pair of radius-defining arms and the various elements of said ladder-securing means, will be rotated in a clockwise direction such that the deployed shown in FIGS. 4 and 5 is reached.

To facilitate the rotation of y-axis rod 42 there is provided lever arm 58 which, when unfolded from the FIG. 1 position to the position shown in FIGS. 2 and 3, is rotatable in the direction by the arrows 61 in FIG. 2 shown near handle 62 of bar 58. Accordingly, there is provided a substantial mechanical advantage so that a user of limited muscle strength can readily effect the rotation of y-axis rod 42, thereby causing the entire ladder securing assembly to deploy downward and to the position shown in FIGS. 4 and 5. This position is typically at about the chest level of most persons so that, therefrom, a typical aluminum-weight ladder can be easily lifted therefrom, It is noted that the stability of motion of the ladder securing assembly and associated ladder, during both deployment and retraction thereof, which is accomplished simply by rotating lever bar 58 in the counter-clockwise direction of arrow 61 is assured through the use of a double-acting piston 64 which includes a first rod 66 and second rod 68. A first end of said first rod 66 is pivotally secured at a medial site 70 to said x-axis slidable member 18 while an outer end of each second rod 68 is eccentrically journalled by an eccentric coupling 72 about said y-axis rod 42. This coupling occurs on said y-axis rod 42 at about the planes that said rod 42 is journalled to proximal end 46 of slidable x-axis linear member 18. See FIG. 2. Accordingly, the mechanical function of eccentric coupling 72 is to permit outer ends of rod 68 of double acting piston 64 to eccentrically rotate about y-axis rod 42 as said rod 42 is rotated by the rotation 61 of lever bar 58. The double acting piston 64 thereby operates to stabilize the motion of the ladder-securing means and other elements of the instant system during deployment and retraction thereof, this adding to the overall safety of the system during use and, as well, reducing the potential vibration of the system when the automotive vehicle is in operation.

While there has been shown and described the preferred embodiment of the present invention it is to be understood that the invention may be embodied otherwise than is herein specifically shown and described and that, within said embodiment certain changes may be made in the form and arrangements of the parts without departing from the underlying idea or principles of the invention as set forth in the Claims appended herewith.

Having thus described my invention what I claim as new, useful and non-obvious and, accordingly, secure by Letters Patent of the United States is:

1. A ladder storage, securing and deployment system for a utility vehicle having a substantially flat roof, the system comprising:
   (a) a pair of linear co-parallel x-axis tracks secured to said roof of said vehicle transversely to a longitudinal y-axis of said vehicle;
   (b) a pair of x-axis linear members, each complementally slidable within a corresponding one of said x-axis tracks;
   (c) a pair of co-parallel first radius-defining xz-plane rotatable arms, an origin of each radius of rotation of said arms located at a pivot point within each of said x-axis slidable members and near to a y-axis edge of said roof of said vehicle;
   (d) a y-axis rod journalled within proximal ends of said x-axis slidable members near to said y-axis edge of said vehicle;
   (e) a pair of co-parallel second radius-defining xz plane rotatable arms, an origin of each radius of rotation thereof defined by a rigid coupling of a pivot end of each of said second arms to said y-axis rod, said second arms each being shorter than said first arms;
   (f) ladder-securing means including a pair of co-parallel linear members each having a distal end pivotally secured to a non-origin end of one each of said rotatable arms of said first pair thereof, and each of said co-parallel linear members pivotally secured at about the centers thereof to a non-origin end one each of said rotatable arms of said second pair thereof;
   (g) double-acting piston means having a first end of a first rod thereof pivotally secured to a medial site on one of said x-axis slidable members and said means having a second end of a second rod thereof eccentrically journalled about said y-axis rod; and
   (h) manually actuatable lever means for selectably rotating said y-axis rod to thereby urge, in a desired direction the rotation of said pair of second radius-defining arms and, therewith, said first radius-defining arms and said ladder-securing means while such rotation is stabilized by said double acting-piston means.

* * * * *